April 30, 1929.  C. F. KETTERING  1,710,991
AUTOMATICALLY CONTROLLED TRANSMISSION FOR MOTOR VEHICLES
Filed Aug. 6, 1925   2 Sheets-Sheet 1

Inventor
Charles F. Kettering
By Spencer Small & Hardman
his Attorneys

Patented Apr. 30, 1929.

1,710,991

UNITED STATES PATENT OFFICE.

CHARLES F. KETTERING, OF DAYTON, OHIO, ASSIGNOR TO GENERAL MOTORS RE-SEARCH CORPORATION OF DAYTON, OHIO, A CORPORATION OF DELAWARE.

AUTOMATICALLY-CONTROLLED TRANSMISSION FOR MOTOR VEHICLES.

Application filed August 6, 1925. Serial No. 48,529.

This invention relates to a variable speed transmission device wherein the gear ratio between the drive and driven shafts may have any desired value between predetermined maximum and minimum values.

An object of the invention is to provide such a transmission having means for automatically varying the gear ratio so that when an increased torque load on the driven shaft reduces the speed of the drive shaft the gear ratio will be accordingly increased to permit the drive shaft to maintain its speed and prevent stalling thereof.

A more specific object is to provide means operated by the vacuum of the intake duct of an internal combustion engine for varying the amplitude of oscillation of the one-way clutches which are driven by the engine and which drive the drive shaft.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the drawings.

Figure 1:
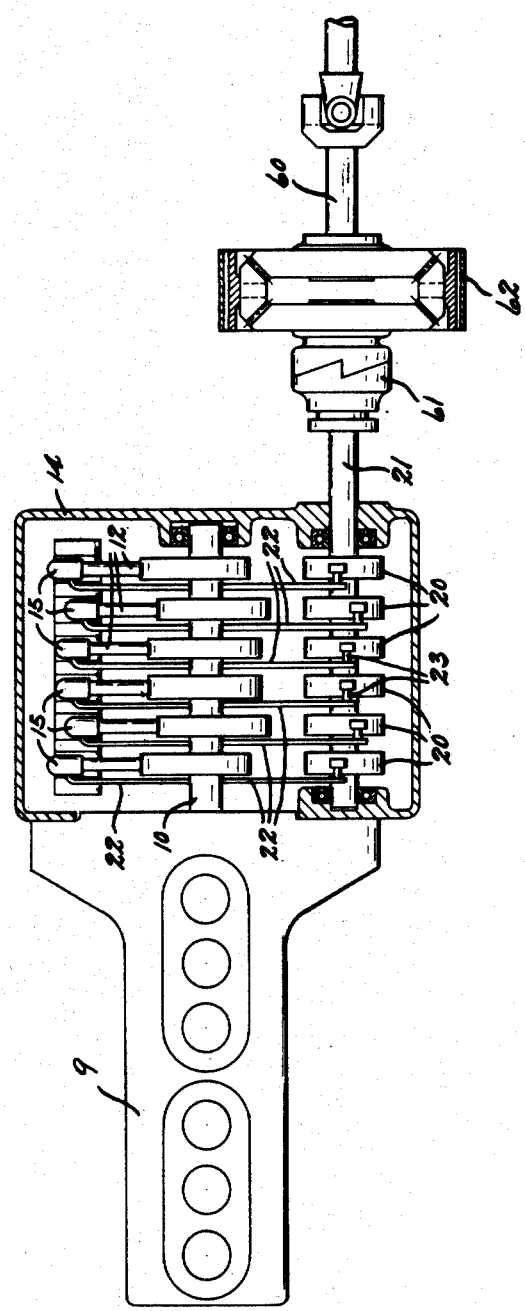
Fig. 1 is a diagrammatic plan view of a drive mechanism for an automobile according to this invention.
Figure 2:
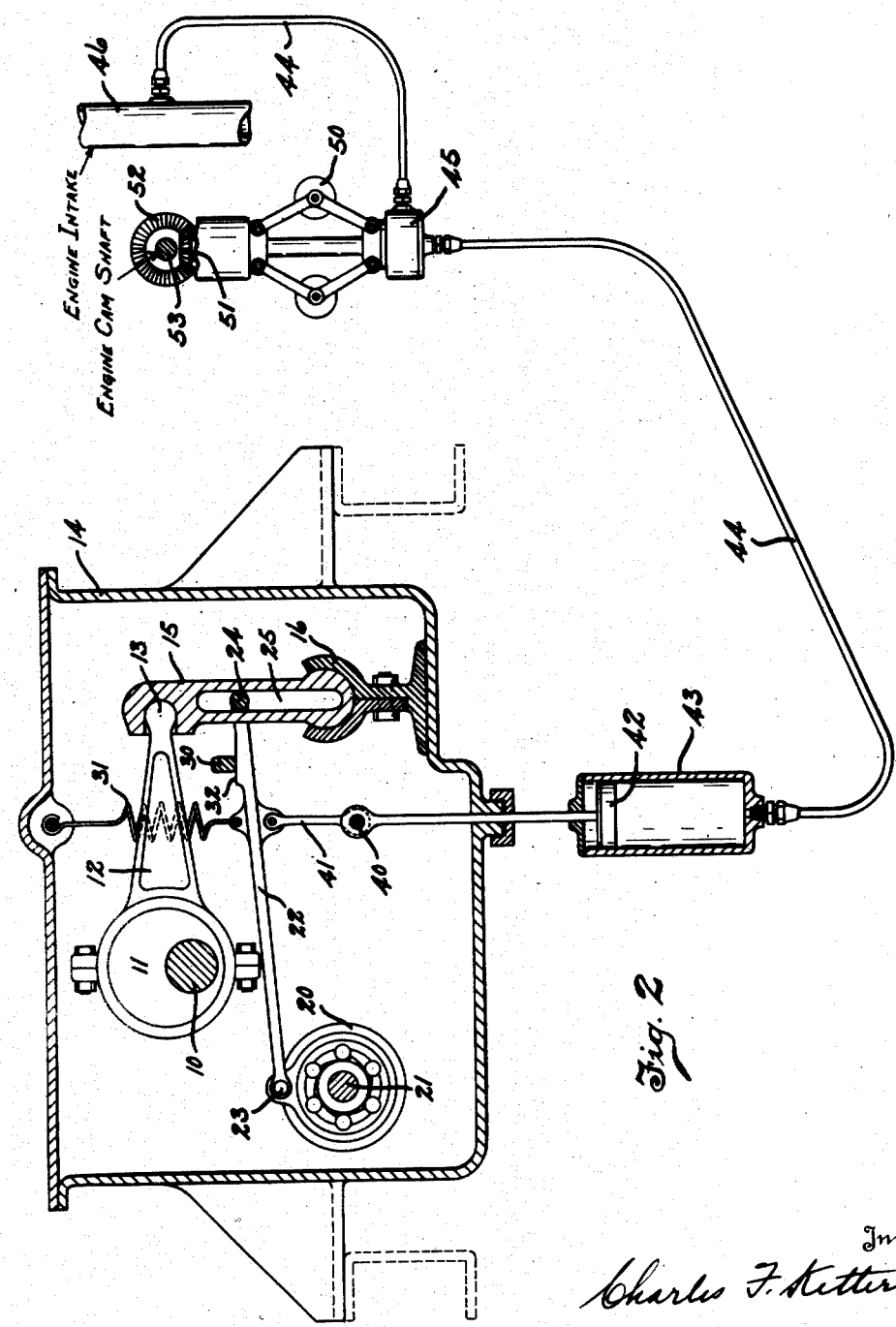
Fig. 2 is a diagrammatic view on an enlarged scale showing one of a series of units of the transmission mechanism and the control means therefor.

Numeral 10 designates an extension of the crank shaft of the internal combustion engine 9. This shaft 10 has a series of eccentrics 11 fixed thereto in uniformly spaced phase relations. Each eccentric 11 drives a connecting rod 12 whose outer or small end 13 is suitably pivoted upon a rocking lever 15. Each of the rocking levers 15 is pivoted at its lower end upon a stationary socket pivot 16 about which it rocks or oscillates when driven by the eccentric 11 and connecting rod 12. Each rocker lever 15 drives one of a series of oscillating one-way clutches 20 suitably arranged upon the driven shaft 21. These clutches 20 are indicated in the drawing as having roller or ball pawls which engage the ratchet fixed to shaft 21 when rotated in one direction and which run free when rotated in the other direction. However, it is to be understood that any other suitable one-way clutch may be used in the combination herein disclosed and claimed. The connecting links 22 are each pivoted at 23 to the clutches 20 while their opposite ends 24 are laterally turned and are slidably connected within the slots 25 in rocker levers 15. Obviously when the ends 24 are at the top of slots 25 the clutches 20 are oscillated by rocker levers 15 at their maximum amplitude, and when the ends 24 are at the bottom of slots 25 there will be no oscillation of clutches 20 since the ends 24 will then be concentric with the pivot sockets 16.

It is therefore clear that the speed ratio between the drive shaft 10 and the driven shaft 21 may have all values between a predetermined minimum value (when pin 24 is at top of slot 25) and a very high value (when pin 24 is but slightly removed from the center of pivot 16).

Means for controlling this speed ratio will now be described. A vertically reciprocatable shifting bar 30 which rides in suitable stationary guides in the transmission housing 14 and which extends across all the links 22 is employed to move all the connecting links 22 downward at the same time and to the same extent against the tension of the coil springs 31 which are individually secured to each of the links 22. Each of the links 22 is provided with a cam surface 32 which slides over the bottom side of the shifting bar 30 when the links are reciprocated. This shifting bar 30 is arranged to be shifted up and down manually to any desired position whereby the amplitude of oscillation of clutches 20 is controlled as desired. The particular means for manually shifting the bar 30 has not been illustrated in the drawings for the sake of clearness of illustration of the remaining parts of the mechanism.

In addition to the manually operated means 30 for shifting the position of the links 22 an automatic speed controlled means is also provided. All the links 22 are connected to a horizontal shifting bar 40 by means of the pivoted rods 41 which are of such length as to permit the connecting rod motion of the links 22 while the shifting bar 40 remains stationary. This bar 40 is vertically reciprocatable by a motive power device such as the piston 42 in the vacuum cylinder 43. A duct 44 leads from cylinder 43 through the automatic control valve 45 to the engine intake pipe 46. The position of the automatic control valve 45 is regulated by the speed governor 50 which may be driven by the bevel gears 51 and 52 from the engine cam shaft 53. As the engine speed decreases the valve 45 is opened progressively to permit the engine intake suction to act with a progressively increasing force to draw down the piston 42 in cylinder 43 against the urge of the coil springs 31. It is obvious that when the torque load on the driven shaft increases beyond a certain value the engine will slow down somewhat. This slowing down of the engine will immediately cause control valve 45 to open further to cause a downward movement of piston 42 and hence a downward movement of pin 24 in slot 25, which of course decreases the torque load on the engine shaft 10. The control valve 45 will therefore greatly reduce the variations in the engine speed caused by variations of the torque load on the driven shaft. This invention will therefore give a more constant engine speed when applied to automobiles and hence give a more efficient and reliable operation thereof.

In Fig. 1 the driven shaft 21 is shown as connected to the automobile propeller shaft 60 through a square jaw clutch 61 and a marine type reverse gear 62. The clutch 61 is arranged to be declutched at will by the operator by a suitable shifting yoke and lever (not shown). The brake band of the reverse gear 62 is tightened by the operator by suitable and well known mechanism when it is desired to reverse the direction of rotation of shaft 60. Since this type of reverse gear is well known in the art and specifically forms no part of the present invention it will not be described in detail herein.

While the form of embodiment of the present invention as herein disclosed constitutes a preferred form, it is to be understood that other forms might be adopted, all coming within the scope of the claims which follow.

What is claimed is as follows:

1. In combination, an internal combustion engine having a fuel intake duct and a crank shaft, a series of rocker levers connected to and rocked by said crank shaft, a driven shaft, a series of oscillating one-way clutches thereon, a series of oscillating links individually connecting said rocker levers to said clutches whereby said clutches are actuated to drive said driven shaft, a vacuum motor connected to said intake duct, connections between said motor and said link and lever mechanism arranged upon actuation of the motor to vary the speed ratio between said shafts, and means for automatically actuating said vacuum motor according to the engine speed.

2. In a variable speed transmission, in combination, a drive shaft, a rocker lever connected to and rocked by the drive shaft, a driven shaft, an overrunning clutch thereon, a link connecting the clutch with the rocker lever, means for varying the leverage of the rocker lever with respect to the link comprising a motive power device and means responsive to variations of speed of the drive shaft for controlling the motive power device.

3. In combination, an internal combustion engine having a fuel intake duct, a member driven by the engine, a variable speed transmission between said engine and said member, a vacuum motor connected to said intake duct, connections between the vacuum motor and the variable speed transmission whereby to vary the speed ratio thereof, and means responsive to engine speed for controlling the vacuum motor.

In testimony whereof I hereto affix my signature.

CHARLES F. KETTERING.